United States Patent [19]
Ono et al.

[11] Patent Number: 5,734,634
[45] Date of Patent: Mar. 31, 1998

[54] RECORDING METHOD AND RECORDING EQUIPMENT OF OPTICAL DISC REPRODUCING METHOD AND REPRODUCING EQUIPMENT OF OPTICAL DISC

[75] Inventors: Masumi Ono, Tokyo; Tatsuya Narahara, Kanagawa, both of Japan

[73] Assignee: Sony Corporation, Japan

[21] Appl. No.: 702,615

[22] PCT Filed: Jan. 23, 1996

[86] PCT No.: PCT/JP96/00117

§ 371 Date: Oct. 25, 1996

§ 102(e) Date: Oct. 25, 1996

[87] PCT Pub. No.: WO96/23303

PCT Pub. Date: Aug. 1, 1996

[30] Foreign Application Priority Data

Jan. 23, 1995 [JP] Japan ................................. 7-007839

[51] Int. Cl.[6] ...................................... G11B 7/095
[52] U.S. Cl. ............................ 369/44.28; 369/44.26; 369/44.29; 369/50; 369/54
[58] Field of Search ..................... 369/44.26, 44.28, 369/44.29, 44.34, 44.41, 50, 54, 58, 124

[56] References Cited

U.S. PATENT DOCUMENTS 4,691,588  9/1987  Kumatani et al. .
4,980,877  12/1990  Sugiyama et al. ............ 369/44.41
5,363,356  11/1994  Tanaka et al. ............... 369/44.29
5,412,628  5/1995  Yamazaki et al. ............. 369/54
5,452,284  9/1995  Miyagawa et al. ............ 369/44.26
5,568,461  10/1996  Nishiuchi et al. ............ 369/44.26
5,650,984  7/1997  Yamaguchi et al. ........... 369/44.28

FOREIGN PATENT DOCUMENTS 57-50330   3/1982   Japan .
2-177027   10/1990  Japan .
59-168939  9/1994   Japan .
40628857 A 10/1994  Japan .

*Primary Examiner*—Thang V. Tran
*Attorney, Agent, or Firm*—Ronald P. Kananen

[57] ABSTRACT

The present invention radiates laser light to an optical disc 1, detects a tracking error signal based on a concave and convex form of a track by means of its reflection light, applies a tracking servo so as to selectively follow any one track of a concave track or a convex track of a spot of the laser light by using this tracking error signal, continuously stores modulation data in a memory 13, and then records on the track to which the tracking servo is applied. Further, the present invention reverses a polarity of the tracking error signal when carrying out a track jump from a track, on which current data is recorded, to an adjacent track, applies the tracking servo to a new track, reads out the modulation data from the memory 13, and records the data on the new track. Accordingly, the present invention can record the data on the concave track and the convex track while carrying out the track jump.

12 Claims, 7 Drawing Sheets

RECORDING METHOD AND RECORDING EQUIPMENT OF OPTICAL DISC REPRODUCING METHOD AND REPRODUCING EQUIPMENT OF OPTICAL DISC

TECHNICAL FIELD

The present invention relates to a recording method and a recording equipment of an optical disc, and a reproducing method and a reproducing equipment of an optical disc, in particular relates to a method or the like which records data (information) on both tracks of an optical disc having a concave track and a convex track and reproduces the data from both the tracks.

BACKGROUND ART

For example, in an optical disc, such as a compact disc for reproducing, a recordable and reproducible magneto-optical disc, a phase change disc and the like, in which a guide ditch (groove) is provided in advance, up to now, data (information) is recorded on any one of a land or a groove.

By the way, in order to make a recording density of an optical disc higher or to make its capacity larger, a numerical aperture of an objective lens of a so-called optical pick-up is made large, a wave length of laser light is made short, and simultaneously a track pitch is made small. However, if making the numerical aperture larger, this results in a problem that the optical pick-up becomes larger as well as heavier. Further, there is a limit in developing a laser diode having a short wave length.

Then, in recent years, a method has been researched in which both of a land and a groove are defined as a recording track (hereafter, referred to as a concave track and a convex track) and data is recorded on these tracks. However, a concrete and actual method is not proposed which records data on a concave track and a convex track and then reproduces the data therefrom.

The present invention is proposed in view of such circumstances. It is therefore an object of the present invention to provide a recording method and a recording equipment of an optical disc, and a reproducing method and a reproducing equipment of an optical disc, which can record data on both of a concave track and a convex track of an optical disc having a guide ditch, and reproduce the data from both the concave track and the convex track of the optical disc.

DISCLOSURE OF THE INVENTION

In a recording method of an optical disc in accordance with the present invention, an optical disc having a concave track and a convex track is rotated and driven at a faster speed than a rotation speed corresponding to a speed of inputted data. It radiates laser light to the optical disc, detects a tracking error signal based on a concave and convex form of the track by means of its reflection light, and applies a tracking servo so as to selectively follow any one track of the concave track or the convex track of a spot of the laser light by using this tracking error signal. It stores the inputted data in a memory, reads out the data from the memory, and records on the track to which the tracking servo is applied. And, it reverses a polarity of the tracking error signal when carrying out a track jump from a track, on which current data is recorded, to an adjacent track, applies the tracking servo to a new track, reads out the data from the memory, and records the data on the new track.

In a reproducing method of an optical disc in accordance with the present invention, an optical disc having a concave track and a convex track is rotated and driven at a faster speed than a rotation speed corresponding to a sending speed of reproduced data. It radiates laser light to the optical disc, detects a tracking error signal based on a concave and convex form of the track by means of its reflection light, and applies a tracking servo so as to selectively follow any one track of the concave track or the convex track of a spot of the laser light by using the tracking error signal. It reproduces data from the track to which the tracking servo is applied and stores the reproduced data in a memory, and then reads out the data at the sending speed and outputs as the reproduced data. It reverses a polarity of the tracking error signal when carrying out a track jump from a track, on which current data is reproduced, to an adjacent track, and applies the tracking servo to a new track, reproduces the data from the new track, stores in the memory, and outputs the reproduced data continuously during the track jump operation.

A recording equipment of an optical disc in accordance with the present invention includes an optical disc rotating means for rotating and driving an optical disc having a concave track and a convex track at a faster speed than a rotation speed corresponding to a speed of inputted data, a tracking error signal detecting means for radiating laser light to the optical disc which is rotated and driven by the optical disc rotating means and detecting a tracking error signal based on a concave and convex form of the track by means of its reflection light, a tracking servo means for applying a tracking servo so as to selectively follow any one track of the concave track or the convex track of a spot of the laser light, by using the tracking error signal from the tracking error signal detecting means, a memory means for storing the inputted data, a data recording means for reading out the data stored in the memory means and recording the data on the track to which the tracking servo is applied by the tracking serve means, a track jump means for carrying out a rack jump of the data recording means from a track, on which current data is recorded, to an adjacent new track, and a reversing means for reversing the tracking error signal from the tracking error signal detecting means when the track jump of the data recording means is carried out by the track jump means, and sending to the tracking servo means.

A reproducing equipment of an optical disc in accordance with the present invention includes an optical disc rotating means for rotating and driving an optical disc having a concave track and a convex track at a faster speed than a rotation speed corresponding to a sending speed of inputted data, a tracking error signal detecting means for radiating laser light to the optical disc which is rotated and driven by the optical disc rotating means and detecting a tracking error signal based on a concave and convex form of the track by means of its reflection light, a tracking servo means for applying a tracking servo so as to selectively follow any one track of the concave track or the convex track of a spot of the laser light by using the tracking error signal from the tracking error signal detecting means, a data reproducing means for reproducing the data from the track to which the tracking servo is applied by the tracking servo means, a memory means for storing the data from the data reproducing means and then reading out the data at the sending speed and outputting as the reproduced data, a track jump means for carrying out a track jump of the data reproducing means from a track, on which current data is reproduced, to an adjacent new track, and a reversing means for reversing a polarity of the tracking error signal from the tracking error signal detecting means when the track jump of the data reproducing means is carried out by the track jump means and sending to the tracking servo means.

BEST MODE FOR CARRYING OUT THE INVENTION

A preferred embodiment in accordance with the present invention will be explained hereinafter.

Figure 1:
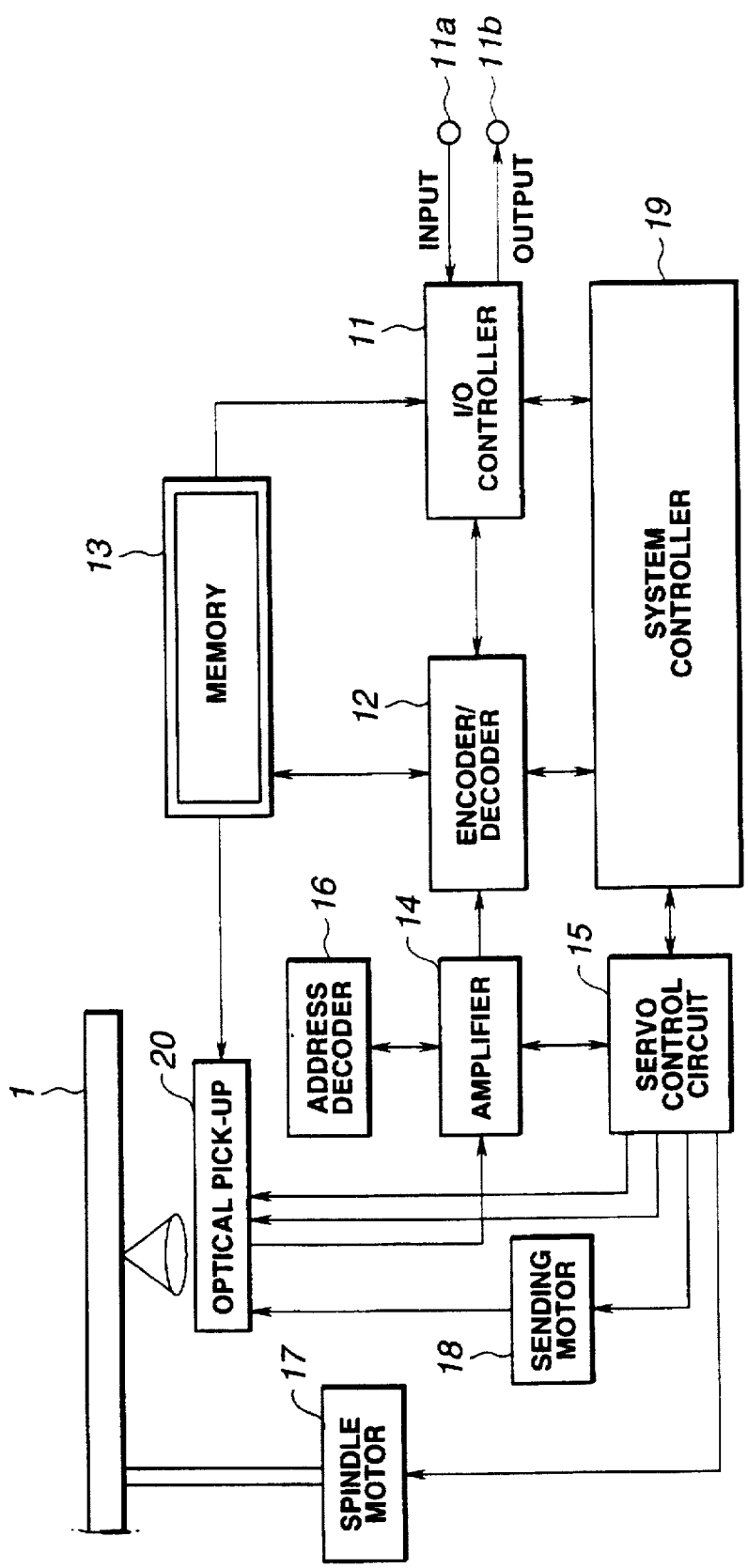
FIG. 1 is a block diagram showing a configuration of an optical disc recording and reproducing equipment in accordance with the present invention.

FIG.1 is a block diagram showing a configuration of an optical disc recording and reproducing equipment in accordance with the present invention.

This optical disc recording and reproducing equipment, as shown in FIG. 1, includes an I/O controller 11 for controlling an input and an output of data, an encoder/decoder 12 for modulating the data from the I/O controller 11 by using a predetermined modulation method and for demodulating the modulated data, a memory 13 for transiently storing the data from the encoder/decoder 12 and the like, an optical pick-up 20 for radiating laser light to an optical disc 1 based on the data from the memory 13 and recording the data and further detecting, by means of its reflection light, a tracking error signal based on a concave or convex form of a track on the optical disc 1, an amplifier 14 for amplifying a so-called RF signal from the optical pick-up 20 and further outputting the tracking error, a servo control circuit 15 for applying a tracking servo operation so as to selectively follow any one track of the concave track or the convex track of a spot of the laser light by using the tracking error signal from the amplifier 14, a spindle motor 17 for rotating and driving the optical disc 1, and a system controller 19 for controlling the I/O controller 11, the servo control circuit 15 and the like.

And, this optical disc recording and reproducing equipment is adapted, for example, to record data sent through a terminal 11a from a computer, on the concave track and the convex track on the optical disc 1, by repeating a so-called track jump, and further to reproduce the recorded data from the concave track and the convex track on the optical disc 1 and output the data to the computer through a terminal 11b.

Now, a construction of the optical disc 1 and a track format thereof are explained.

Figure 2:
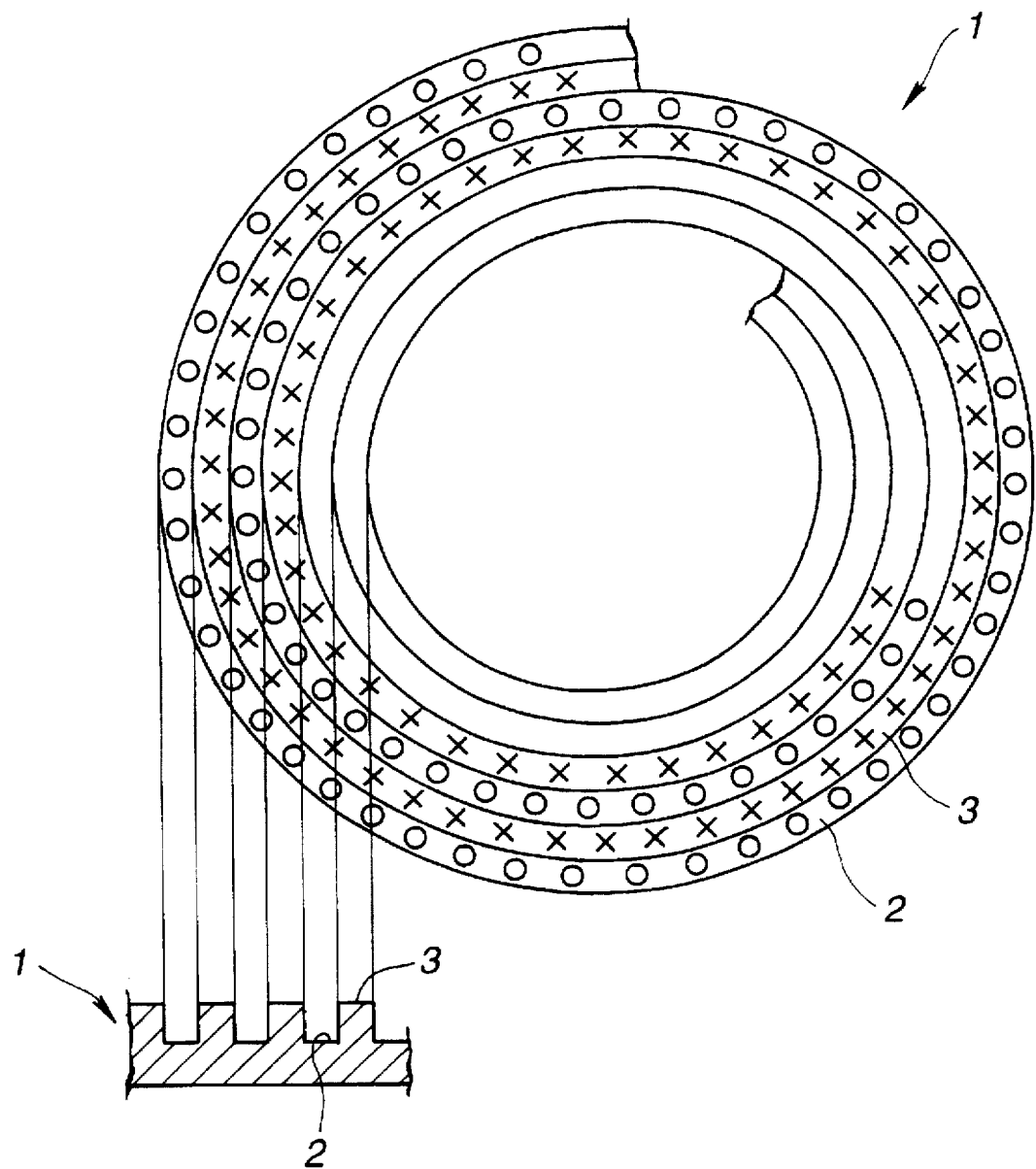
FIG. 2 is a view showing diagrammatically a concave track and a convex track formed on an optical disc.
Figure 3:
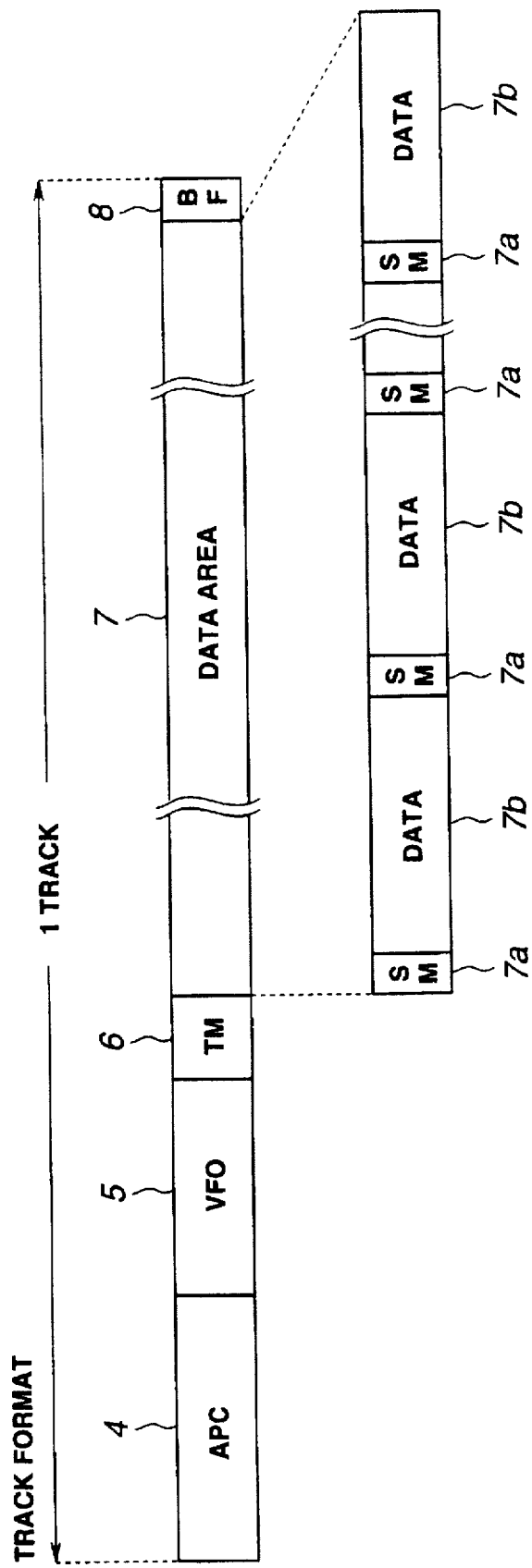
FIG. 3 is a view showing a track format.

The optical disc 1 is composed of, for example, a phase change type of an optical disc. For example, as shown in FIG. 2, a concave track 2 and a convex track 3 are spirally formed in advance on this optical disc 1. And, this optical disc 1 is rotated and driven by the spindle motor 17 controlled by the servo control circuit 15, for example, at a faster speed than a rotation speed corresponding to a speed of data inputted by a computer. Here, assuming an area on the concave or convex track relative to one rotation of the optical disc 1 to be one track, for example, as shown in FIG. 3, on this one track, there are provided, an APC area 4 for controlling a power of the laser light, a VFO area 5 for reproducing a clock, a track mark (TM) area 6 for recording a data pattern indicating a track number, a data area 7 for recording data and a buffer area 8 for carrying out the track jump.

And, the APC area 4 is used to control the power of the laser light at time of recording or reproducing the data. That is, the laser light is radiated from a laser diode in the optical pick-up 20 to the optical disc 1. Then, a driving current in the laser diode is controlled, as described later, in such a way that the power is suitable for recording of the data, on the basis of quantity of light reflected from the APC area 4. Further, the driving current at the time of reproducing the data is controlled such that the power is a predetermined power lower than the above mentioned power.

Further, for example, a consecutive data pattern is recorded on the VFO area 5. This consecutive data pattern is used to control an oscillation frequency of a voltage control oscillator (VCO) in a so-called PLL (Phase Locked Loop) for reproducing the clock and to thereby lock the PLL.

The track number is recorded on the track mark area 6. The track jump intended to record and reproduce the data is carried out on the basis of this track number.

The data area 7, as shown in FIG. 3, for example, is divided into a plurality of sectors. At a first portion of each of sectors, a sector mark (SM) area 7a is provided which is for recording a data pattern indicating a sector number, and a data area 7b for recording actual data is continuously provided. For example, the data is recorded and reproduced under a unit of a sector.

The buffer area 8, as described later, is an area intended to carry out the track jump from the concave track 2 or the convex track 3 to an adjacent track thereof. Incidentally, in the present invention, it is also possible to use an optical disc having the concave track and the convex track, that is, a guide ditch (a so-called groove) as the optical disc 1, for example, a magneto-optic disc and the like. Further, for example, it is possible to use an optical disc on which the concave track and the convex track are formed in a concentric circle form.

Next, an operation of the optical disc recording and reproducing equipment when recording data on the optical disc 1 having the above mentioned construction or reproducing the data from the optical disc 1 is explained.

The I/O controller 11, for example, receives data, for example, with a data speed of 5 Mbps, sent through the terminal 11a from the computer under control of a system controller 19, and sends the received data to the encoder/decoder 12.

The encoder/decoder 12 modulates data sent from the I/O controller 11, by using a predetermined modulation method, for example, such as a (1,7) modulation, a (2,7) modulation, a (8,16) modulation or the like, which is suitable for recording of the data on a phase change type disc, and sends the obtained modulation data to the memory 13.

Here, for example, assuming that it takes 5 msec to complete the track jump operation, data quantity transferred for that period is 25 k (=5 $10^6$ 5 $10^{-3}$) bits. Therefore, the memory 13 has a capacity of 25 k bits, stores the modulation data sent from the encoder/decoder 12 transiently, reads out the stored data, and sends it to the optical pick-up 20. As a result, it is also possible to send the data transferred from the computer to the optical pick-up 20 without losing the data, while the optical pick-up 20 is carrying out the track jump. Incidentally, the memory 13 may have, for example, a capacity relative to one rotation of the optical disc 1. Specifically, for example, assuming the rotational number of the optical disc 1 to be 800 rpm, the time required for the one rotation of the optical disc 1 is 75 msec. The data quantity transferred for this 75 msec becomes 375 k bits. Then, it is allowable to set the capacity of the memory 13 as 375 k bits.

The optical pick-up 20, for example, includes a laser diode, a collimator lens, a grating, a beam splitter, an objective lens, a cylindrical lens, a collective lens, a plurality of photo detectors and the like.

And, this optical pick-up 20 drives the laser diode based on the modulation data sent from the memory 13, at a power equal to or more than a melting point of a phase change material of a recording layer on the concave track 2 or the convex track 3. Further, the optical pick-up 20 radiates the laser light outputted by the laser diode through the collimator lens, the grating, the beam splitter and the objective lens to the concave track 2 or the convex track 3 to which the tracking servo of the optical disc 1 is applied as described later. As a result, the phase change material of the recording layer to which the laser light is radiated is changed, for example, from a crystal state to a non-crystal state (mark), and thereby the data is recorded on the concave track 2 or the convex track Further, at this time, the optical pick-up 20 and the amplifier 14, for example, detect the tracking error signal based on the concave and convex form of the track by using a so-called three-spot method, detect a focus error signal by using an astigmatism method, and send these error signals to the servo control circuits 15.

Figure 4:
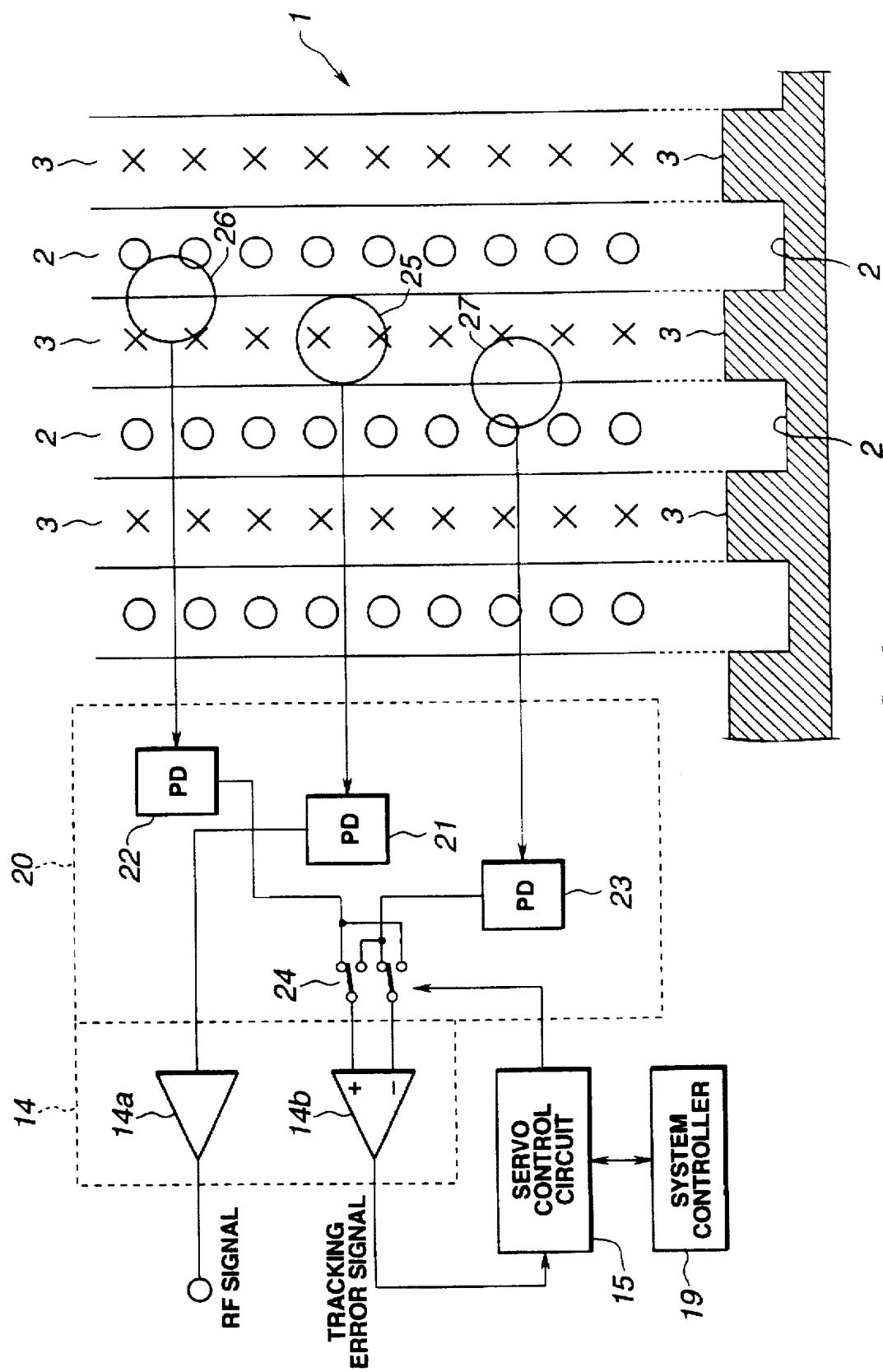
FIG. 4 and FIG. 5 are block diagrams showing an actual circuit configuration of a main portion of an optical pick-up constituting the optical disc recording and reproducing equipment.

Specifically, the optical pick-up 20, for example, as shown in FIG. 4, includes a photo detector 21 for receiving reflection light corresponding to a main spot 25 in the three-spot method, photo detectors 22 and 23 for receiving reflection light corresponding to two side spots 26 and 27, respectively, a change switch 24 for reversing a polarity of the tracking error signal. Further, the amplifier 14, as shown in FIG. 4, includes an amplifier 14a for amplifying an output from the photo detector 21 and a differential amplifier 14b for detecting a difference between respective outputs from the photo detectors 22 and 23.

Figure 5:
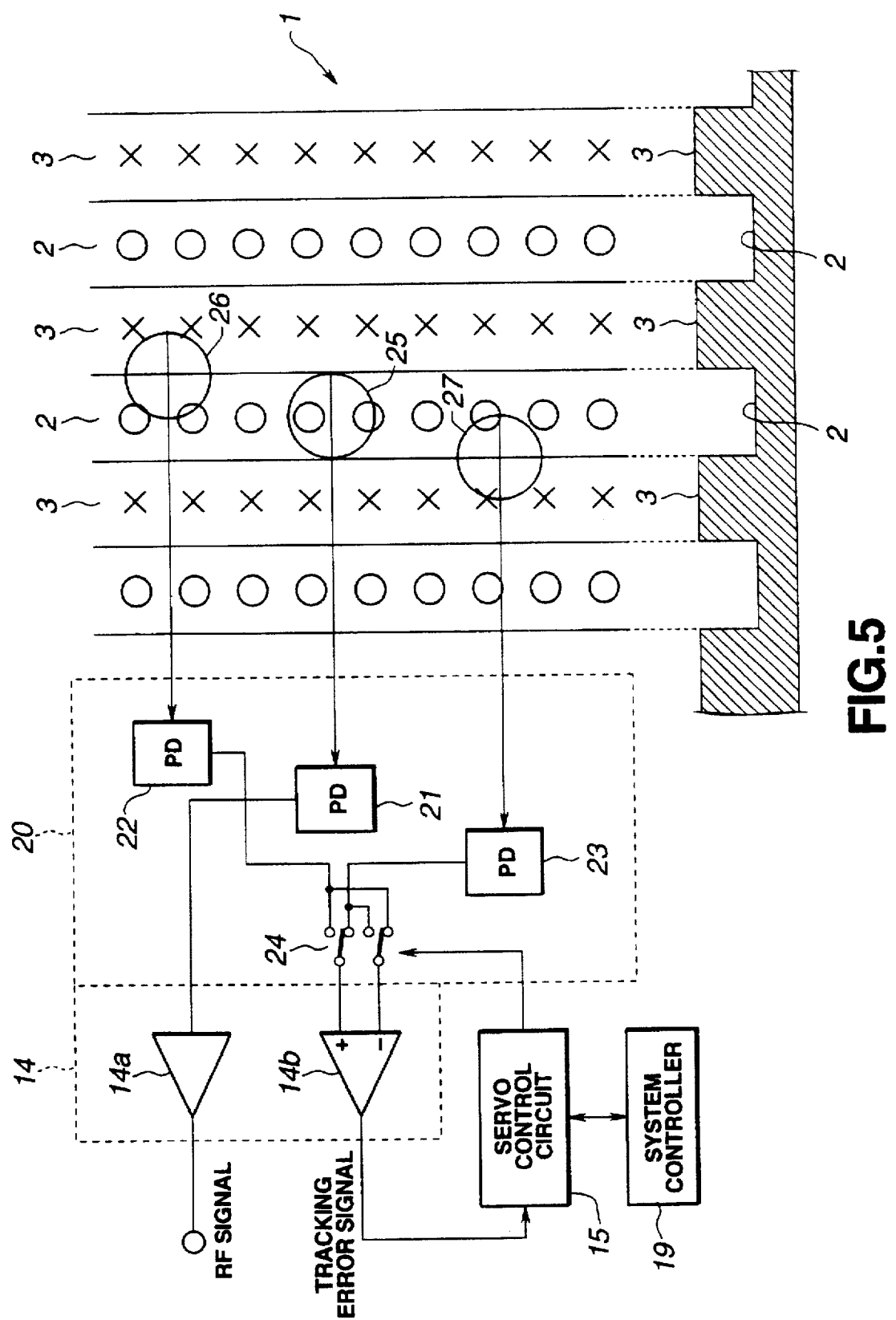

And, the photo detectors 22 and 23 receive the reflection light from the optical disc 1, through the objective lens, the beam splitter, the cylindrical lens and the collective lens, that is, receive the reflection light corresponding to the side spots 26 and 27, respectively, and send respective signals corresponding to the light quantities through the change switch 24 to the differential amplifier 14b. The differential amplifier 14b generates the tracking error signal based on the concave and convex form of the track, by obtaining the difference between the respective signals from the photo detectors 22 and 23. Specifically, for example, when the tracking servo is applied to the convex track 3 and the data is recorded on this convex track 3, the change switch 24, as shown in FIG. 4, under control of the servo controlling circuit 15, sends the output from the photo detector 22 to a plus input terminal of the differential amplifier 14b, and sends the output from the photo detector 23 to a minus input terminal. On the other hand, when the tracking servo is applied to the concave track 2 and the data is recorded on this concave track 2, the change switch 24, for example, as shown in FIG. 5, sends the output from the photo detector 22 to the minus input terminal of the differential amplifier 14b, and sends the output from the photo detector 23 to the plus input terminal. Accordingly, from the differential amplifier 14b, the tracking error signal is obtained in which its polarity varies, from a case when the tracking servo is applied to the concave track 2, to a case when the tracking servo is applied to the convex track 3. The difference amplifier 14b sends the tracking error signal to the servo control circuit 15.

Further, although detail explanation is omitted, the optical pick-up 20 and the amplifier 14 detect the focus error signal, for example, by using a so-called four-division photo detector, and send this focus error signal to the servo control circuit 15.

The servo control circuit 15 drives a voice coil, which moves the objective lens in a so-called two-axis device to a diametric direction of the optical disc 1, based on the tracking error signal sent from the differential amplifier 14b. Accordingly, the tracking servo is applied to the concave track 2 or the convex track 3 such that the tracking error signal becomes 0. Specifically, for example, assuming that the tracking servo is applied to the concave track 2 at a zero cross point of a leading edge in a so-called S curve of the tracking error signal, since the polarity of tracking error signal is reversed by the change switch 24, the tracking servo is applied to the convex track 3 at the zero cross point of a trailing edge in the S curve of the tracking error signal which is not reversed. Thus, for example, when a signal indicating that the track jump is carried out from a convex track 3 (for example, FIG. 4) recording current data to an adjacent concave track 2 (for example, FIG. 5) is sent from the system controller 19, the servo control circuit 15 opens a loop in a tracking servo control, and sends a driving current, which moves the objective lens to an adjacent track (carries out the track jump), to the optical pick-up 20. After that, the servo control circuit 15 changes the change switch 24 and also closes the servo loop and carries out the tracking servo control. In this way, the track jump is carried out from the convex track 3 to the adjacent concave track 2.

Further, the servo control circuit 15 drives the voice coil which moves the objective lens in the two-axis device to an optical axis direction, based on the focus error signal sent from the amplifier 14. Further, when carrying out the track jump over a plurality of tracks and at other times, the servo control circuits 15 controls the sending motor 18, and moves the whole of the optical pick-up 20 to the diametric direction of the optical disc 1. And, the data is recorded, as mentioned above, for the concave track 2 or the convex track 3 to which the focus servo is applied and also to which the tracking servo is applied.

On the other hand, reproducing of the data from the concave track 2 or the convex track 3 is carried out, as described below, in a state that the focus servo and the tracking servo are carried out.

The optical pick-up 20 radiates to the optical disc 1 the laser light having the power equal to or less than the melting point of the phase change material, and outputs the RF signal corresponding to the light quality of its reflection light. Specifically, the photo detector 21 receives the reflection light corresponding to the main spot 25 through the objective lens, the beam splitter, the cylindrical lens and the collective lens, and sends the obtained RF signal to the amplifier 14a. The amplifier 14a amplifies this RF signal. Further, the amplifier 14 sends the data obtained by making this RF signal binarized, to the encoder/decoder 12 and an address decoder 16.

The address decoder 16 extracts the track number recorded on the track mark area 6 among the data sent from the amplifier 14, and the sector number recorded on the sector mark area 7a. The track and the sector for reproducing the data are specified accordingly. Incidentally, changing between a modulation mode and a demodulation mode in the encoder/decoder 12 is carried out under control of the system controller 19.

The encoder/decoder 12 demodulates the data recorded on the data area 7b among the data sent from the amplifier 14, that is, the modulation data, and sends the reproduced data to the memory 13.

The memory 13, after transiently storing the data sent from the encoder/decoder 12, reads out the stored data, and sends to the I/O controller 11. The I/O controller 11 outputs the data sent from the memory 13, through the terminal 11b to the computer. As a result, while the optical pick-up 20 is carrying out the track jump, it is possible to continuously output the data to the computer.

Incidentally, a method for detecting the tracking error signal is not limited to the above mentioned three-spots method. For example, it is allowable to use a so-called differential push-pull method and the like. Further, it is allowable to detect the focus error signal by using other methods, for example, such as a knife edge method and the like.

Figure 6:
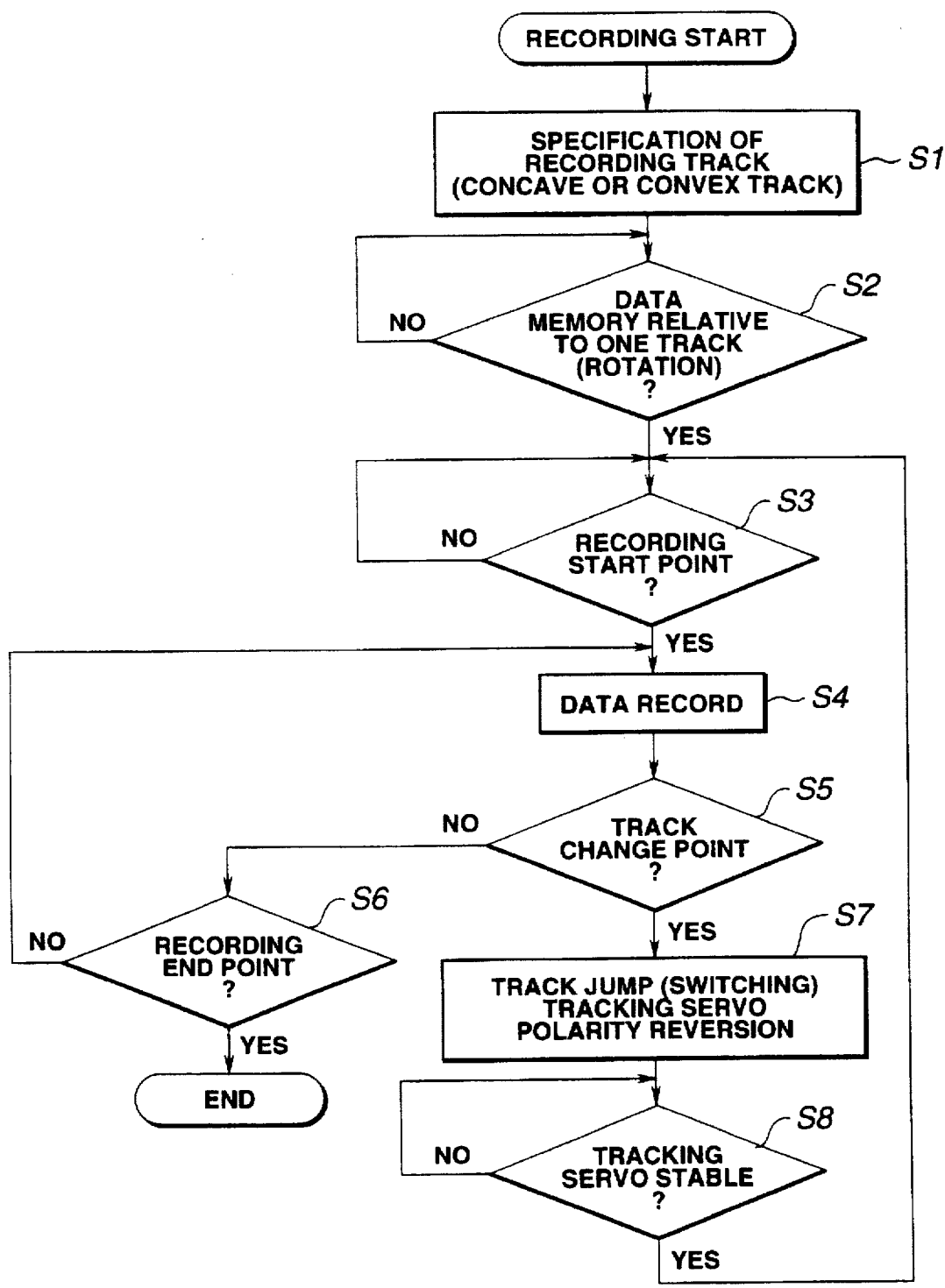
FIG. 6 is a flow chart of explaining an actual data recording operation of the optical disc recording and reproducing equipment.

Next, an actual operation when recording data on the concave track and the convex track alternatively, for example, while carrying out the track jump per one rotation of the optical disc 1, in this optical disc recording and reproducing equipment, is explained with reference to a flow chart shown in FIG. 6.

At a step S1, the system controller 19 sends to the servo control circuit 15, for example, the track number indicating the concave track or the concave track for recording the data, and proceeds to a step S2. At this time, the servo control circuit 15 transiently stops the servo control, and for example, drives and controls the sending motor 18 on the basis of the track number from the system controller 19. As a result, the optical pick-up 20 moves to a track direction in which the data recording is carried out.

At the step S2, the system controller 19 judges whether or not, for example, the data relative to one track, namely, the modulation data relative to the data quantity sent from the computer for a period when the optical disc 1 makes one rotation is stored in the memory 13. Then, the system controller 19 proceeds to a step S3 if the judgement is affirmative and repeats the step S2 if the judgement is negative.

At the step S3, the system controller 19 judges whether or not, for example, the main spot 25 arrives at the specified concave track or convex track, based on the track number detected by the address decoder 16. Then, the system controller 19 proceeds to a step S4 if the judgement is affirmative and repeats the step S3 if the judgement is negative. That is, the system controller 19 until the main spot 25 arrives at the track on which the data recording is carried out. And, the servo control circuit 15 carries out the tracking servo control when the main spot 25 arrives at the track which is a target of the data recording.

At the step S4, the system controller 19 controls the memory 13, the servo control circuit 15, the optical pick-up 20 and the like, so as to start the data recording, and proceeds to a step S5. As a result, the data recording is started for the specified concave track or convex track.

At the step S5, the system controller 19 judges whether or not, for example, the main spot 25 arrives at a track change point of carrying out the track jump, that is, the buffer area 8 located at a final tail of one track, based on the sector number detected by the address decoder 16. Then, the system controller 19 proceeds to a step S6 if the judgement is negative, and proceeds to a step 7 if the judgement is affirmative.

At the step S7, assuming an adjacent track, namely, a track on which data has been recorded by this time, for example, to be a concave track, the system controller 19 controls the servo control circuit 15 such that the main spot 25 jumps to a convex track adjacent to the concave track, and proceeds to a step S8. The servo control circuit 15, as mentioned above, controls the optical pick-up 20 such that the main spot 25 carries out the track jump to the adjacent convex track, and also changes the change switch 24. As a result, the tracking error signal whose polarity is reversed is sent to the servo control circuit 15, and the tracking servo is applied to the convex track.

At the step S8, the system controller 19 judges whether or not the tracking servo operation is stable, on the basis of a signal indicating a state of the tracking servo sent from the servo control circuit 15. Then, the system controller 19 returns to the step S3 if the judgement is affirmative, and repeats the step S8 if the judgement is negative.

On the other hand, at the step S6, the system controller 19 judges whether or not the main spot 25 arrives at a finish point of the data recording, that is, whether or not the data recording is finished, on the basis of the track number and the sector number. Then, the system controller 19 finishes processing of the data recording if the judgement is affirmative, and returns to the step S4 if the judgement is negative.

As is evident above, this optical disc recording and reproducing equipment radiates the laser light to the optical disc 1, detects the tracking error signal based on the concave and convex form of the track by means of its reflection light, and applies the tracking servo so as to selectively follow any one track of the concave track or the convex track of the spot of the laser light by using this tracking error signal. And, this equipment transiently stores the modulation data in the memory 13, then records the data on the track to which the tracking servo is applied. When carrying out the track jump from the track, on which the current data is recorded, to the adjacent track, this equipment reverses the polarity of the tracking error signal, applies the tracking servo to a new track, reads out the modulation data from the memory 13, and record the modulation data on the new track. Accordingly, this equipment can record the data on the concave track and the convex track while carrying out the track jump. Further, by carrying out the track jump in the buffer area 8, the data can be sequentially recorded on the concave track and the convex track which are adjacent to each other, and the data recording can be carried out at a fast speed. Furthermore, by storing the data in the memory 13 transiently and then recording it, the data inputted while the track jump is carried out can be recorded without losing it.

Incidentally, the method in which the track jump is carried out per one rotation of the optical disc 1 and the data is recorded is explained above. However, in a case of using an optical disc in which the concave track and the convex track are formed spirally, it is allowable that the track jump is carried out per plural rotations of the optical disc and then the data is recorded on the convex track and the convex track. That is, this method can reduce the number of the track jump, and thereby can record the data at a faster speed.

Figure 7:
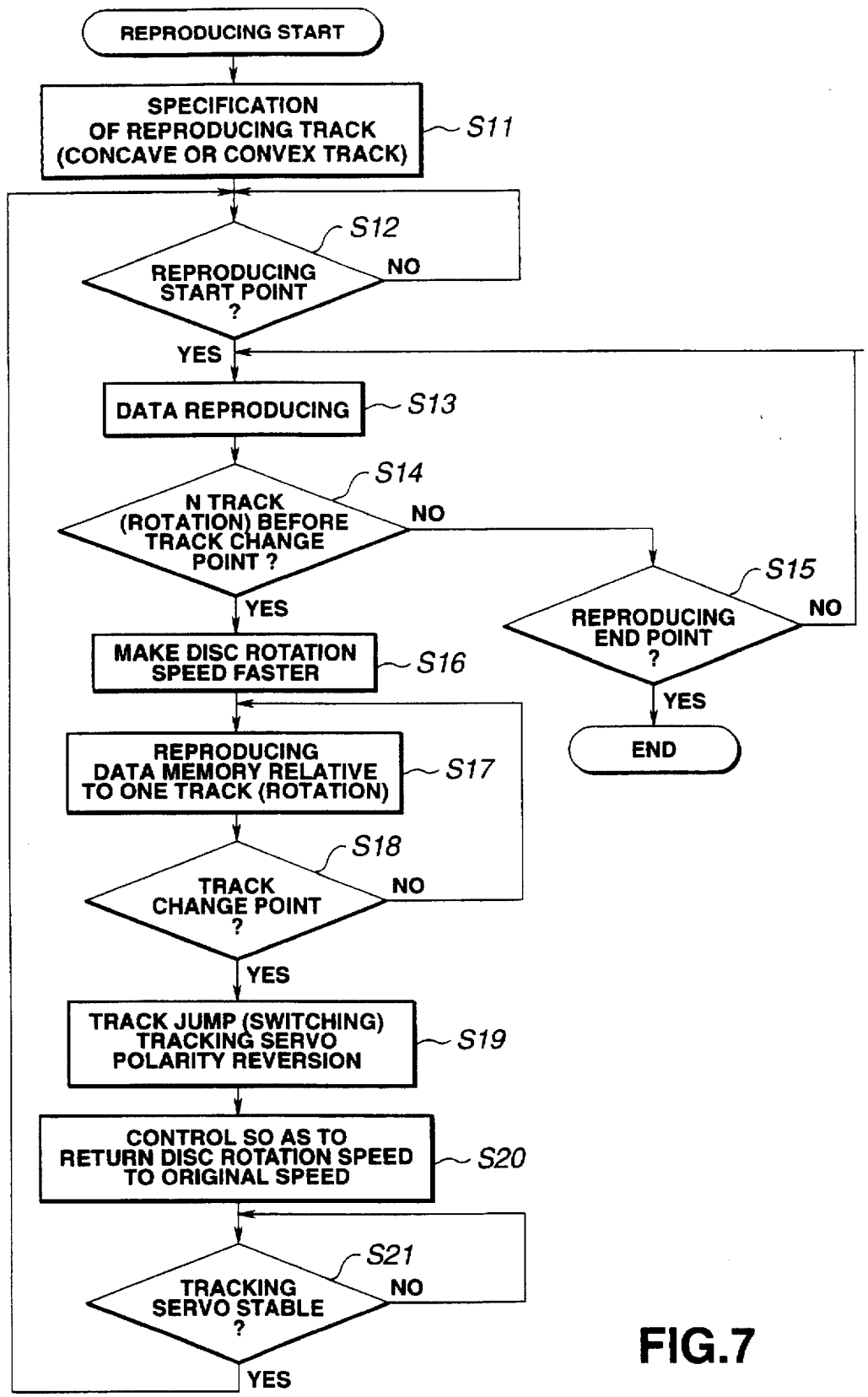
FIG. 7 is a flow chart of explaining an actual data reproducing operation of the optical disc recording and reproducing equipment.

Next, an actual operation when reproducing the data from the concave track and the convex track, for example, while carrying out the track jump per a plurality of rotations of the optical disc 1, in this optical disc recording and reproducing equipment, is explained with reference to a flow chart shown in FIG. 7.

At a step S11, the system controller 19 sends to the servo control circuit 15, for example, the track number indicating the concave track or the concave track for reproducing the data, and proceeds to a step S12. At this time, the servo control circuit 15 stops the servo control transiently, and for example drives and controls the sending motor 18 on the basis of the track number from the system controller 19. As a result, the optical pick-up 20 moves to a track direction in which the data reproducing is carried out.

At the step S12, the system controller 19 judges whether or not, for example, the main spot 25 arrives at the specified concave track or convex track, based on the track number detected by the address decoder 16. Then, the system controller 19 proceeds to a step S13 if the judgement is affirmative, and repeats the step S12 if the judgement is negative. That is, the system controller 19 until the main spot 25 arrives at the track on which the data reproducing is carried out. The servo control circuit 15 carries out the tracking servo control when the main spot 25 arrives at the track which is a target of the data reproducing.

At the step S13, the system controller 19 controls the memory 13, the servo control circuit 15, the optical pick-up 20 and the like, so as to start the data reproducing, and proceeds to a step S14. As a result, the data reproducing is started for the specified concave track or convex track.

At the step S14, the system controller 19 judges whether or not, for example, the main spot 25 arrives at a track located at N tracks before a target track to which the track jump is carried out. Then, the system controller 19 proceeds to a step S15 if the judgement is negative, and proceeds to a step 16 if the judgement is affirmative.

At the step S16, the system controller 19 controls the servo control circuit 15 such that the rotation speed of the optical disc 1 becomes faster, and proceeds to a step S17. And, the servo control circuit 15 rotates the spindle motor 17 at a faster speed.

At the step S17, the system controller 19 controls the memory 13 so as to store, for example, the data relative to one track, that is, the data reproduced for a period when the optical disc 1 makes one rotation, and then proceeds to a step S18.

At the step S18, the system controller 19 judges whether or not, for example, the main spot 25 arrives at the track change point of carrying out the track jump, that is, the buffer area 8 located at the final tail of one track, based on the track number and the sector number detected by the address decoder 16. Then, the system controller 19 proceeds to a step S19 if the judgement is affirmative, and returns to the step 17 if the judgement is negative.

At the step S19, assuming an adjacent track, namely, a track on which data has been reproduced by this time, for example, to be a concave track, the system controller 19 controls the servo control circuit 15 such that the main spot 25 jumps to a convex track adjacent to the concave track, and proceeds to a step S20. And, as mentioned above, the servo control circuit 15 controls the optical pick-up 20 such that the main spot 25 carries out the track jump to the adjacent convex track, and also changes the change switch 24. As a result, the tracking error signal whose polarity is reversed is sent to the servo control circuit 15, and the tracking servo is applied to the convex track.

At the step S20, the system controller 19 controls the servo control circuit 15 such that the rotation speed of the optical disc 1 becomes the original rotation speed, and proceeds to a step S21. And, the servo control circuit 15 rotates the spindle motor 17 at the original rotation speed.

At the step S21, the system controller 19 judges whether or not the tracking servo operation is stable, on the basis of the signal indicating the state of the tracking servo sent from the servo control circuit 15. Then, the system controller 19 returns to the step S12 if the judgement is affirmative, and repeats the step S21 if the judgement is negative.

On the other hand, at the step S15, the system controller 19 judges whether or not the main spot 25 arrives at a finish point of the data reproducing, that is, whether or not the data reproducing is finished, on the basis of the track number and the sector number. Then, the system controller 19 finishes processing of the data reproducing if the judgement is affirmative, and returns to the step S13 if the judgement is negative.

As is evident above, this optical disc recording and reproducing equipment radiates the laser light to the optical disc 1, detects the tracking error signal based on the concave and convex form of the track by means of its reflection light, and applies the tracking servo so as to selectively follow any one track of the concave track or the convex track of the spot of the laser light by using this tracking error signal. And, this equipment reproduces the data from this track and stores in the memory, then reads out and outputs the data at a predetermined sending speed. When carrying out the track jump from the track, on which the current data is reproduced, to the adjacent track, this equipment reverses the polarity of the tracking error signal, applies the tracking servo to a new track, reproduces the data from this new track and stores in the memory, and outputs the reproduced data continuously even during the track jump operation. Accordingly, this equipment can reproduce the data from the concave track and the convex track while carrying out the track jump between the concave track and the convex track. Further, by storing the data in the memory 13 transiently and outputting it, the data can be continuously outputted while the track jump is carried out.

Incidentally, the method in which the track jump is carried out per a plurality of rotations of the optical disc 1 and the data is reproduced is explained above. However, similarly to the case of the above mentioned data recording, it is allowable that the track jump is carried out per one rotation of the optical disc 1 and then the data is reproduced. In this case, it is possible to sequentially reproduce the data from the concave track and the convex track which are adjacent to each other. Further, by carrying out the track jump in the buffer area 8, it is possible to sequentially reproduce the data from the concave track and the convex track which are adjacent to each other, and thereby it is possible to carry out the data reproducing at a fast speed. Especially, it is effective in a case of using an optical disc in which the concave track and the convex track are concentrically formed.

What is claimed is:

1. A recording method of an optical disc, characterized in that said recording method comprising the step of:

rotating and driving an optical disc having a concave track and a convex track at a faster speed than a rotation speed corresponding to a speed of inputted data;

radiating laser light to said optical disc, detecting a tracking error signal based on a concave and convex form of said track by means of its reflection light;

applying a tracking servo so as to selectively follow any one track of the concave track or the convex track of a spot of the laser light by using said tracking error signal;

storing said inputted data in a memory;

reading out the data from said memory, and recording on the track to which said tracking servo is applied;

reversing a polarity of the tracking error signal when carrying out a track jump from a track, on which current data is recorded, to an adjacent track, and applying the tracking servo to a new track; and reading out the data from said memory, and recording the data on said new track.

2. A recording method of an optical disc according to claim 1, characterized in that assuming an area on a track relative to one rotation of said optical disc to be one track, said track jump is carried out in a predetermined area within said one track per one rotation of the optical disc.

3. A recording method of an optical disc according to claim 1, characterized in that said concave track and convex track are formed spirally on the optical disc, and said track jump is carried out per a plurality of rotations of the optical disc, and the data is recorded on the concave track and the convex track.

4. A reproducing method of an optical disc, characterized in that said recording method comprising the step of:

rotating and driving an optical disc having a concave track and a convex track at a faster speed than a rotation speed corresponding to a sending speed of reproduced data;

radiating laser light to said optical disc, detecting a tracking error signal based on a concave and convex form of said track by means of its reflection light;

applying a tracking servo so as to selectively follow any one track of the concave track or the convex track of a spot of the laser light by using said tracking error signal;

reproducing data from the track to which said tracking servo is applied;

storing said reproduced data in a memory, and then reading out the data at said sending speed, and outputting as said reproduced data;

reversing a polarity of the tracking error signal when carrying out a track jump from a track, on which current data is reproduced, to an adjacent track, and applying the tracking servo to a new track; and reproducing the data from said new track and storing in said memory, and outputting the reproduced data continuously during said track jump operation.

5. A reproducing method of an optical disc according to claim 4, characterized in that assuming an area on a track relative to one rotation of said optical disc to be one track, said track jump is carried out in a predetermined area within said one track per one rotation of the optical disc.

6. A reproducing method of an optical disc according to claim 4, characterized in that said concave track and convex track are formed spirally on the optical disc, and said track jump is carried out per a plurality of rotations of the optical disc, and the data is reproduced from the concave track and the convex track.

7. A recording equipment of an optical disc, comprising:

an optical disc rotating means for rotating and driving an optical disc having a concave track and a convex track at a faster speed than a rotation speed corresponding to a speed of inputted data;

a tracking error signal detecting means for radiating laser light to the optical disc which is rotated and driven by said optical disc rotating means, and detecting a tracking error signal based on a concave and convex form of said track by means of its reflection light;

a tracking servo means for applying a tracking servo so as to selectively follow any one track of the concave track or the convex track of a spot of the laser light, by using the tracking error signal from said tracking error signal detecting means;

a memory means for storing said inputted data;

a data recording means for reading out the data stored in said memory means, and recording the data on the track to which the tracking servo is applied by said tracking serve means;

a track jump means for carrying out a track jump of said data recording means from a track, on which current data is recorded, to an adjacent new track; and a reversing means for reversing the tracking error signal from said tracking error signal detecting means when the track jump of the data recording means is carried out by said track jump means, and sending to said tracking servo means, wherein the data is read out from said memory means, and is recorded on said new track.

8. A recording equipment of an optical disc according to claim 7, characterized in that assuming an area on a track relative to one rotation of said optical disc to be one track, said track jump means carries out the track jump of said data recording means in a predetermined area within said one track per one rotation of the optical disc.

9. A recording equipment of an optical disc according to claim 7, characterized in that said concave track and convex track are formed spirally on the optical disc, and said track jump means carries out the track jump of said data recording means per a plurality of rotations of the optical disc, and said data recording means records the data on the concave track and the convex track.

10. A reproducing equipment of an optical disc, comprising:

an optical disc rotating means for rotating and driving an optical disc having a concave track and a convex track at a faster speed than a rotation speed corresponding to a sending speed of inputted data;

a tracking error signal detecting means for radiating laser light to the optical disc which is rotated and driven by said optical disc rotating means, and detecting a tracking error signal based on a concave and convex form of said track by means of its reflection light;

a tracking servo means for applying a tracking servo so as to selectively follow any one track of the concave track or the convex track of a spot of the laser light, by using the tracking error signal from said tracking error signal detecting means;

a data reproducing means for reproducing the data from the track to which the tracking servo is applied by said tracking servo means;

a memory means for storing the data from said data reproducing means, and then reading out the data at said sending speed, and outputting as said reproduced data;

a track jump means for carrying out a track jump of said data reproducing means from a track, on which current data is reproduced, to an adjacent new track; and a reversing means for reversing a polarity of the tracking error signal from said tracking error signal detecting means when the track jump of the data reproducing means is carried out by said track jump means, and sending to said tracking servo means, wherein the data is reproduced from said new track and stored in said memory means, and the reproduced data is outputted continuously during said track jump operation.

11. A reproducing equipment of an optical disc according to claim 10, characterized in that assuming an area on a track relative to one rotation of said optical disc to be one track, said track jump means carries out the track jump of said data reproducing means in a predetermined area within said one track per one rotation of the optical disc.

12. A reproducing equipment of an optical disc according to claim 10, characterized in that said concave track and convex track are formed spirally on the optical disc, and said track jump means carries out the track jump of said data reproducing means per a plurality of rotations of the optical disc, and said data reproducing means reproduces the data from the concave track and the convex track.

* * * * *